United States Patent [19]

Hofer

[11] 4,001,770
[45] Jan. 4, 1977

[54] ROLL-A-LONG THREE-DIMENSIONAL COMMON DEPTH POINT EXPLORATION

[75] Inventor: Helmut H. Hofer, Calgary, Canada

[73] Assignee: Texas Instruments Incorporated, Dallas, Tex.

[22] Filed: June 17, 1974

[21] Appl. No.: 479,929

[52] U.S. Cl. ............... 340/15.5 MC; 340/15.5 CP
[51] Int. Cl.² ......................................... G01V 1/20
[58] Field of Search ........... 340/15, 5 MC, 15.5 CP

[56] References Cited
UNITED STATES PATENTS

| | | | |
|---|---|---|---|
| 2,580,636 | 1/1952 | Wolf | 340/15.5 MC |
| 3,691,529 | 9/1972 | Pizante | 340/15.5 MC |
| 3,753,222 | 8/1973 | Trostle | 340/15.5 MC |
| 3,793,620 | 2/1974 | Miller | 340/15.5 CP |
| 3,838,390 | 9/1974 | Michon | 340/15.5 CP |
| 3,956,730 | 5/1976 | Barbier | 340/15.5 CC |

Primary Examiner—Howard A. Birmiel
Attorney, Agent, or Firm—Harold Levine; Rene' E. Grossman; Leo N. Heiting

[57] ABSTRACT

Seismic wave detectors are located so as to form a two-dimensional array. One or more seismic wave transmitting stations are located at predetermined locations relative to the array. Seismic waves are generated from the transmitting station and received by the detector array. The transmitting station and portions of the array are then both moved to new locations along the direction of a seismic traverse and additional seismic waves are generated. The procedure is repeated to provide three-dimensional common depth point coverage of the earth's subsurface. Alternatively, intermediate to each movement of the detector array partial moveups of the transmitting station may be employed for the purpose of generating more closely spaced three-dimensional depth point coverage and in some cases, a higher fold stack.

In the preferred embodiment of the method, the areal recording spread is so disposed as to behave, both in terms of recording and processing, like a standard single line roll-a-long spread commonly used in the seismic prospecting art.

20 Claims, 9 Drawing Figures

| H | G | F | D E | C | B | A |
|---|---|---|---|---|---|---|
| | | | 4 | | | |
| 8 | 7 | 6 | 5 | 3 | 2 | 1 |
| | | | 12 | | | |
| 16 | 15 | 14 | 13 | 11 | 10 | 9 |
| | | | 20 | | | |
| 24 | 23 | 22 | 21 | 19 | 18 | 17 |
| | | | 28 | | | |
| 32 | 31 | 30 | 29 | 27 | 26 | 25 |
| | | | 36 | | | |
| 40 | 39 | 38 | 37 | 35 | 34 | 33 |
| | | | 44 | | | |
| 48 | 47 | 46 | 45 | 43 | 42 | 41 |
| | | | 52 | | | |
| 56 | 55 | 54 | 53 | 51 | 50 | 49 |
| | | | 60 | | | |
| 64 | 63 | 62 | 61 | 59 | 58 | 57 |
| | | | 68 | | | |
| 72 | 71 | 70 | 69 | 67 | 66 | 65 |
| | | | 76 | | | |
| 80 | 79 | 78 | 77 | 75 | 74 | 73 |
| | | | 84 | | | |
| 88 | 87 | 86 | 85 | 83 | 82 | 81 |
| | | | 92 | | | |
| 96 | 95 | 94 | 93 | 91 | 90 | 89 |

*Fig. 1d*

|   | A | B | C | D | E | F | G | H |   | SHOT |
|---|---|---|---|---|---|---|---|---|---|------|
| 1–16...1 | 1 | 2 | 3 | 4 | 5 | 6 | 7 | 8 | 9 | 10 | 11 | 12 | 13 | 14 | 15 | 16...17–96 | 1001 |
| 1–32...17 | 17 | 18 | 19 | 20 | 21 | 22 | 23 | 24 | 25 | 26 | 27 | 28 | 29 | 30 | 31 | 32...33–96 | 1002 |
| 1–48...33 | 33 | 34 | 35 | 36 | 37 | 38 | 39 | 40 | 41 | 42 | 43 | 44 | 45 | 46 | 47 | 48...49–96 | 1003 |
| 1–64...49 | 49 | 50 | 51 | 52 | 53 | 54 | 55 | 56 | 57 | 58 | 59 | 60 | 61 | 62 | 63 | 64...65–96 | 1004 |
| 1–80...65 | 65 | 66 | 67 | 68 | 69 | 70 | 71 | 72 | 73 | 74 | 75 | 76 | 77 | 78 | 79 | 80...81–96 | 1005 |
|           | 81 | 82 | 83 | 84 | 85 | 86 | 87 | 88 | 89 | 90 | 91 | 92 | 93 | 94 | 95 | 96... | 1006 |

Fig. 2a

|   | A | B | C | D | E | F | G | H | A | B | C | D | E | F | G | H |   | SHOT |
|---|---|---|---|---|---|---|---|---|---|---|---|---|---|---|---|---|---|------|
| 1–16...17 | 1 | 2 | 3 | 4 | 5 | 6 | 7 | 8 | 9 | 10 | 11 | 12 | 13 | 14 | 15 | 16...17–96 | 2001 |
| 1–32...33 | 17 | 18 | 19 | 20 | 21 | 22 | 23 | 24 | 25 | 26 | 27 | 28 | 29 | 30 | 31 | 32...33–96 | 2002 |
| 1–48...49 | 33 | 34 | 35 | 36 | 37 | 38 | 39 | 40 | 41 | 42 | 43 | 44 | 45 | 46 | 47 | 48...49–96 | 2003 |
| 1–64...65 | 49 | 50 | 51 | 52 | 53 | 54 | 55 | 56 | 57 | 58 | 59 | 60 | 61 | 62 | 63 | 64...65–96 | 2004 |
| 1–80...81 | 65 | 66 | 67 | 68 | 69 | 70 | 71 | 72 | 73 | 74 | 75 | 76 | 77 | 78 | 79 | 80...81–96 | 2005 |
|           | 81 | 82 | 83 | 84 | 85 | 86 | 87 | 88 | 89 | 90 | 91 | 92 | 93 | 94 | 95 | 96 | 2006 |

ROLL-A-LONG THREE-DIMENSIONAL COMMON DEPTH POINT EXPLORATION

This invention relates to seismic exploration and more particularly to a method for performing three-dimensional common depth point seismic prospecting.

The advantages provided by the commonly termed "Common Depth Point Technique" are well known. Disclosures of this technique may be found in U.S. Pat. No. 2,732,906 issued to Mayne on Jan. 31, 1956 and in U.S. Pat. No. 3,217,838 issued to Mendenhall et al on Nov. 16, 1965. However, such previous common depth point techniques have generally only supplied information in a two-dimensional plane.

Initial efforts to extend well-known two-dimensional techniques to the problem of obtaining three-dimensional information about the earth's subsurface lithology involved the simple expedient of shooting a plurality of two-dimensional lines and combining the results obtained therefrom. As a result of the large number of shot points required per unit area of subsurface coverage this approach has proven to be uneconomical. Additionally, this approach requires ready accessibility to all surface areas overlying those subsurface areas which are to be explored. Finally, this approach is not amenable to the use of many powerful analytical techniques which are available with true three-dimensional data.

More recently techniques for providing three-dimensional coverage for use in common depth point (CDP) exploration have been disclosed in U.S. Pat. No. 3,431,999, isued to Glazier on Mar. 11, 1969 and in U.S. Pat. No. 3,753,222, issued to Trostle on Aug. 14, 1973. These techniques, however, realize high fold common depth point coverage through the use of a large number of shot point locations while the detector array remains at a fixed location. Inasmuch as the most costly single element in many seismic prospecting operations is the provision of the seismic sources themselves these techniques may prove to be uneconomical in many prospecting environments. This is particularly true in cases where the use of dynamite sources is a necessity. The technique disclosed by Glazier for example requires that seismic waves be generated twice at many of the shot points. Since, as is often the case, a given borehole can be used only for a single dynamite explosion this technique will often necessitate the drilling of two boreholes at many of the shot point locations. The method of the present invention on the other hand provides an economic balance between the relative expenses of providing and locating seismic wave detectors and sources of seismic waves.

Also the practice of the present method requires a lesser degree of access to the surface terrain than do prior three-dimensional methods, and consequently, presents a lesser ecological threat.

In accordance with one aspect of the invention a two-dimensional array of seismic wave detectors is located on the surface of the earth. A seismic wave transmitting station is located at a preselected point relative to the arry of detectors. Seismic waves generated at the transmitting station and reflected from subsurface discontinuities are received by the array of detectors. The detector array and transmitting station are then moved a given distance along a chosen traverse direction and additional seismic waves are generated at the newly located transmitting station. This procedure is continued repetitively thereby providing three-dimensional common depth point coverage along the traverse.

In accordance with another aspect of the invention, the detectors are located along spaced apart parallel lines. The spacings between adjacent pairs of detectors along each of the parallel lines are all chosen to be equal. A seismic wave transmitting station is located at a preselected point relative to the detector array. Seismic waves initiated at the transmitting station and reflected from subsurface discontinuities are received by the array of detectors. The detector array and seismic transmitting station are then moved a distance equal to the spacing between adjacent pairs of detectors and in a traverse direction which is parallel to any of the spaced apart parallel lines. Again, additional seismic waves are generated at the newly located seismic transmitting station and received by the detector array after reflection from subsurface discontinuities. It will be appreciated by those skilled in the art that continued repetition of this procedure will result in a plurality of records each containing reflections from a given subsurface reflecting point underlying the traverse and that the aggregate set of such points will define a three-dimensional volume. Intermediate CDP coverage may be obtained by moving the seismic wave transmitting station only a submultiple of the spacing between adjacent detectors prior to each new initiation of seismic waves. In accordance with this procedure the detector array itself is moved up only when the number of submultiple moveups of the transmitting station is sufficient to relocate the transmitting station by a distance equal to the spacing between adjacent pairs of detectors. As a second alternative less dense common depth point coverage may be obtained by relocating the detector array and the seismic wave transmitting station by a distance equal to an integral multiple of spacings between adjacent pairs of detectors at each moveup. Thirdly it should be noted that integral and submultiple moveups could be combined if desired.

In accordance with a preferred embodiment of the invention two of the spaced apart parallel lines may be located so as to coincide thereby forming a central control line. The detectors along each of the two lines comprising the control line will be interleaved resulting in a detector density twice as high along the control line as along any of the other outrigger lines. The seismic wave transmitting station is located along this control line. It will be understood by those skilled in the art that the common depth point density along this control line will be twice as high and at half the interval as that realized at points off the control line. Also, in accordance with any of the aforementioned aspects of the invention, it may be desirable in some cases to employ more than a single seismic wave transmitting station.

It will be seen from the foregoing that an object of the invention is to provide a method for obtaining true three-dimensional common depth point coverage of a seismic traverse.

A further object of the invention is to provide three-dimensional common depth point coverage while balancing the relative use of shot points and seismic detectors so as to minimize operating costs per unit volume of coverage and fold of data.

Another object of the invention is to eliminate the use of multiple shots at a given shot point so as to avoid the need to re-drill boreholes when dynamite sources are used.

A still further object of the invention is to minimize the degree of surface access required in obtaining three-dimensional common depth point coverage.

Yet another object of the invention is to provide a method for acquiring three-dimensional CDP data such that the acquired data is directly amenable to processing with existing "single line" hardware and software equipment.

For a more complete understanding of the present invention and for further objects and advantages thereof reference is now made to the following description taken in conjunction with the accompanying drawings in which.

Figure 1A:
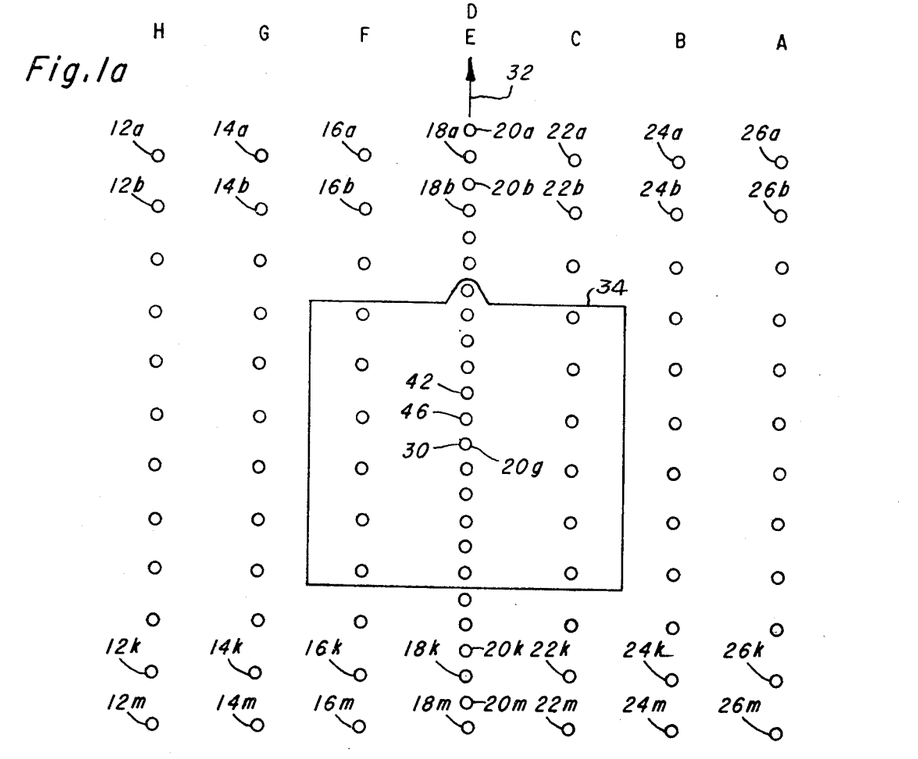
FIG. 1a shows a transmitting station and seismic wave detector layout for the preferred embodiment of the invention.

FIG. 1a portrays the arrangement of seismic wave detectors in the preferred embodiment of the invention. The seismic wave detectors may be geophones or other instruments suitable for the detection of seismic waves and for the purposes of the present discussion will be assumed to be geophones. The geophone array is shown generally at 10. It comprises a plurality of parallel spaced apart rows of geophones such as the "inline" row consisting of geophones 12a through 12m. In the interest of clarity various reference designators have been omitted from FIG. 1a. As shown in the FIGURE these geophones are equally spaced along any of the parallel rows, that is, the spacing between geophones 12a and 12b is equal to that between geophones 12k and 12m. This spacing between adjacent pairs of geophones along any of the inline rows will in general be dictated by considerations of the desired coverage and economy and may typically have a value of 660 feet.

The array 10 consists of eight such parallel rows of geophones. It will be noted that the rows consisting of geophones 18a through 18m and 20a through 20m are located along the same central line of the array and that the geophones of these two rows are interleaved along this central line. This results in a geophone density along the central row which is twice as great as that along any of the other outrigger rows. A shown in the FIGURE the outrigger rows are all equally spaced, that is, the spacing between the rows consisting of geophones 12a through 12m and 14a through 14m is equal to the spacing between the rows consisting of geophones 20a through 20m and 22a through 22m. Again, this spacing is optional but may typically have a value of 880 feet. For purpose of later reference with respect to the preferred embodiment, all geophones with the same small letter designation may be considered to lie on the same "crossline" row. Capital letters refer to inline rows.

While each of the geophones such as those of 12a and 12b have been illustrated in the FIGURE as a single instrument it may be desirable as is common in the art for each of these to comprise a small array of geophones. These small arrays may be linear, circular, or have any other desired configuration. In such case, the electrical outputs of all the geophones within any of these small arrays such as the one at 12a may be connected in parallel so as to produce a single electrical output in response to seismic waves received by the array.

There is illustrated in the FIGURE a single seismic wave transmitting station or shot point indicated by designator 30. It will be noted that in the preferred embodiment the shot point 30 is co-located with geophone 20g. Note that placement of the shot point in a gap, i.e. between geophones 18f and 20g will be recognized as only a minor variation of the method by those skilled in the art. The seismic wave generator used at shot point 30, according to the invention, may comprise any suitable conventional type of seismic disturbance generator. For instance, conventional dynamite shot detonation may be utilized. Alternatively conventional truck mounted vibrating, gas exploder or weight dropping apparatus may be utilized. It should also be understood that as in the case of the geophones, a small array of seismic generators could be placed at shot point 30 and excited simultaneously.

In practicing the method of the invention, the seismic wave generator at shot point 30 is utilized to initiate a seismic disturbance in the earth. The seismic waves resulting from this disturbance propagate into the body of the earth and after reflection from discontinuities existing therein will propagate to the various geophones of array 10. The seismic waves impinging upon the geophones of the array will be converted thereby to electrical signals which may in general be recorded on magnetic tape by one or more field recording systems. As will be recognized by those skilled in the art, various types of such field recording systems are commercially available.

Figure 1B:
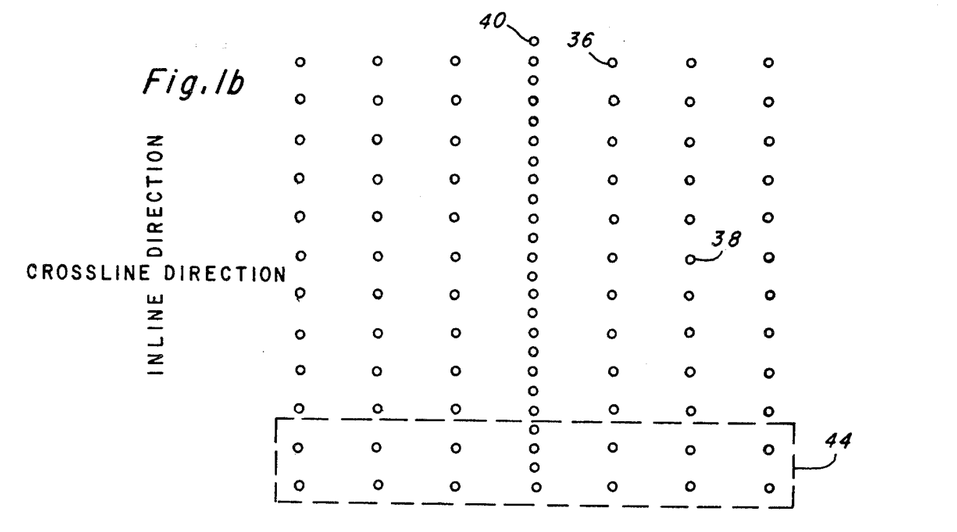
FIG. 1b gives the common depth point coverage resulting from a single excitation at the transmitting station.

If a subsurface horizontal reflecting horizon is assumed, the point on this horizon from which energy will be reflected to any given geophone of the array 10 will lie directly below a surface point midway between that geophone and shot point 30. For such a reflecting horizontal and for the shot point and geophone configuration of FIG. 1a, the surface points below which such reflecting points lie are illustrated in FIG. 1b. In the interest of clarity this reflecting point pattern has been shown separate from FIG. 1a but in reality may be considered to lie within rectangle 34 of FIG. 1a. Thus, energy propagating from shot point 30 to the reflecting horizon and back to geophone 22a will be reflected from a point on the horizon which lies directly below point 36 of FIG. 1b. Similarly, the surface projection of the subsurface reflecting point for the shot point 30-geophone 24f combination is point 38 of FIG. 1b. The surface projection point for the shot point 30-geophone 20a combination is at point 40 of FIG. 1b.

It will be seen that as a result of the particular configuration of geophones utilized the expenditure of a single excitation at a single shot point results in the extensive three-dimensional subsurface coverage of FIG. 1b.

Also, it will be seen that as a result of the interleaving of the geophones of the two lines along the central control line, the density of subsurface points along this central control line is twice as great as that along any of the other lines of subsurface reflecting points.

Continuing with the method of the invention, after the initiation of seismic waves at shot point 30 and their reception at the various geophone locations, the shot point and geophone array are stepped up. Movement is along a seismic traverse direction indicated by arrow 32 of FIG. 1a. In the preferred embodiment, this direction is parallel to the various inline rows along which the geophones are located. The shot point is advanced over a distance equal to the spacing between any adjacent pair of geophones along one of the geophone lines. Thus, in FIG. 1a the shot point is moved from location 30 to location 42. The geophone array is also advanced by a similar distance. In general this will most readily be accomplished by moving the geophones from the back end of the array and relocating them at the forward end of the array. Geophones 12m, 14m, . . . ,26m are moved to locations immediately ahead of geophone positions 12a, 14a, . . . ,26a. With the shot point and geophone array occupying their new positions seismic waves are again generated at the shot point and after reflection from subsurface discontinuities are received by the geophone array. Again, a pattern of subsurface reflecting points similar to that shown in FIG. 1b will result, but in this case, the pattern of reflection points will be advanced in the direction of the traverse 32 by a distance equal to the spacing between adjacent shot points. With the shot point and geophone array in this newly located position, no reflections will be received from points enclosed within the dotted rectangle 44 of FIG. 1b. There will be additional subsurface reflections from points underlying all of the other common depth points of FIG. 1b, not enclosed within rectangle 44. There will be new subsurface reflecting points underlying common depth points at the forward end of FIG. 1b.

This procedure of advancing both the shot point and the geophone array is repeated until a desired length of the seismic traverse has been covered. As is evident from a consideration of FIGS. 1a and 1b, with the exception of a taper on and taper off at the beginning and ending portions of the traverse, six-fold coverage of all common depth points will result. Taper is from one to six fold over six shots.

Figure 1C:
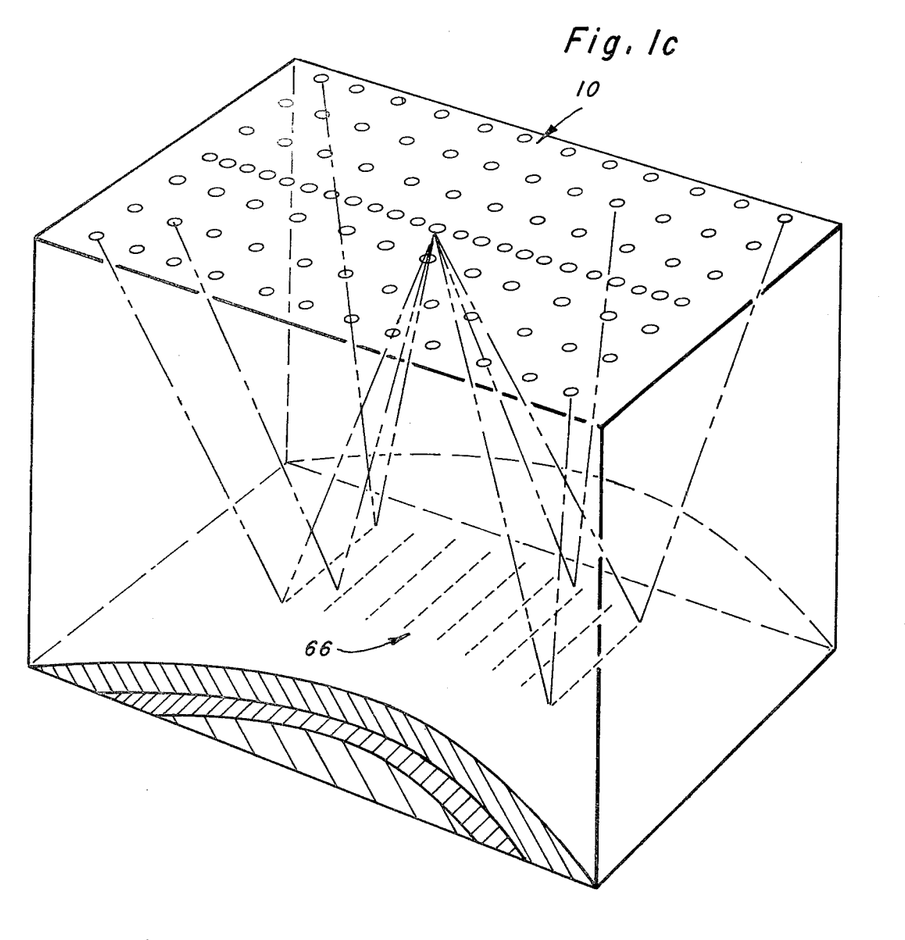
FIG. 1c is a diagram illustrating the three-dimensional aspects of exploration according to the invention.

Various travel paths for energy propagating from the shot point to a subsurface reflecting horizon and then back to the seismic detectors of the array are shown diagramatically in FIG. 1c. An array of seismic wave detectors located on the surface of the earth is shown generally at 10. A single shot point 30 is co-located with one of the seismic wave detectors of the array. Several representative ray paths are shown for energy reflected from a portion of a subsurface reflecting discontinuity shown generally at 66. It will be seen from the FIGURE that, such discontinuities in general not being planar and horizontal, the set of such reflecting points comprises a three-dimensional volume. This is particularly true since, although not shown, there will in general be reflections from other discontinuities located above and below the one shown.

While the preferred embodiment has been disclosed as having an array composed of eight entire rows of geophones each comprising twelve geophones it will be appreciated by those skilled in the art that variations on this theme may be desirable in given situations. When the moveup of the shot point at each iteration is over a distance equal to the spacing between adjacent pairs of geophones along any of the outrigger lines, the fold of common depth point coverage resulting will be equal to one-half the number of geophones along any of the outrigger lines. Thus, eight fold coverage would be realized by the addition of four geophones to each of the inline rows of geophones. The spacing between common depth points in the direction of the traverse is controlled by the spacing between adjacent pairs of geophones along any of the parallel lines. Similarly, the spacing between common depth points in a direction perpendicular to the direction of the traverse is controlled by the spacing between the parallel lines of geophones.

Furthermore, the number of parallel lines of geophones is a variable subject to the choice of the user as is the number of lines that are interleaved. For example, three lines could be interleaved along the central control line and several other control lines could be formed.

In the preferred embodiment of the invention where geophones are moved ahead one crossline at a time and the shot point is moved ahead by one inline geophone interval, there is a preferred number of geophones per crossline. For a given desired CDP fold and a given number of recording channels, the preferred number of geophones per crossline is equal to the number of geophones moved up at each moveup for conventional single line shooting at the particular fold. For example, where single line six-fold coverage is desired using a 96 trace recorder, the normal surface moveup is $96/(2 \times 6) = 8$ geophones. Hence where six-fold three-dimensional coverage is desired, eight geophones per crossline would be used in the preferred embodiment of the invention. Thus the preferred receiver array would consist of eight inline rows of 12 geophones each or equivalently twelve crossline rows of eight geophones each. Electrically the geophones of FIG. 1a are hooked up to have the channel numbers shown in FIG. 1d. Note that at each moveup of the geophone array the channel numbers of all geophones are changed. If, for example, the array is moved up one crossline at a time, then after the first such moveup, the geophones having channel numbers 1–8 in FIG. 1d will be in the second crossline of the new array. Hence after the first such moveup, these geophones will be assigned channel numbers 9–16. The eight geophones which have been moved up will be assigned channel numbers –8 in the newly located spread.

The importance of these relationships rests in the fact that for such an arrangement the same trace pattern, both in a surface and subsurface sense, will result from roll-a-long three-dimensional shooting as from conventional single line shooting. Of course, in the case of roll-a-long three-dimensional shooting, depth points are located on successive crosslines rather than on a single inline. A comparison of FIGS. 2a and 2b will clarify this point.

Figure 2A:
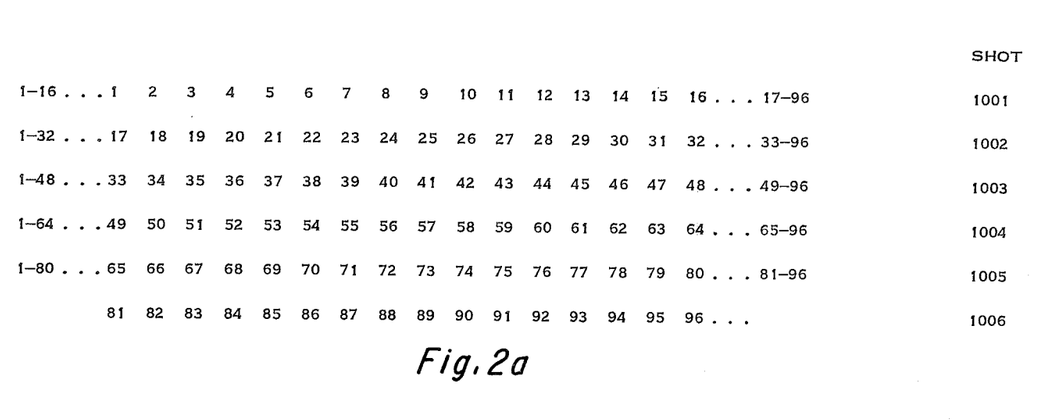
FIG. 2a shows the CDP stacking pattern for 96 trace, 6 fold conventional single line recording.

FIG. 2a shows the well known DCP trace stacking pattern for 96 trace, six-fold conventional single line recording. The figure shows the various combinations of data channels which are summed to arrive at the CDP stacks. There are 96 geophone channels corresponding to shot 1001. For the purpose of clarity only 16 of the channels are shown individually. After an eight geophone moveup of the array and shot point, shot 1002 is produced. Again there will be 96 geophone channels, only channels 17–32 being shown individually in this case. The FIGURE is arranged so that those channels from the various shots that appear in a given column are summed to produce the stack for a single CDP. After successive moveups shots 1003–1006 each result in 96 geophone channels of information. From FIG. 2a it is seen that channels 1, 17, 33, 49, 65 and 81 from the six respective shots are summed to produce the CDP stack at a first depth point. Similarly channels 2, 18, 34, 50, 66 and 82 are summed to produce the stack at a second depth point.

Figure 1D:
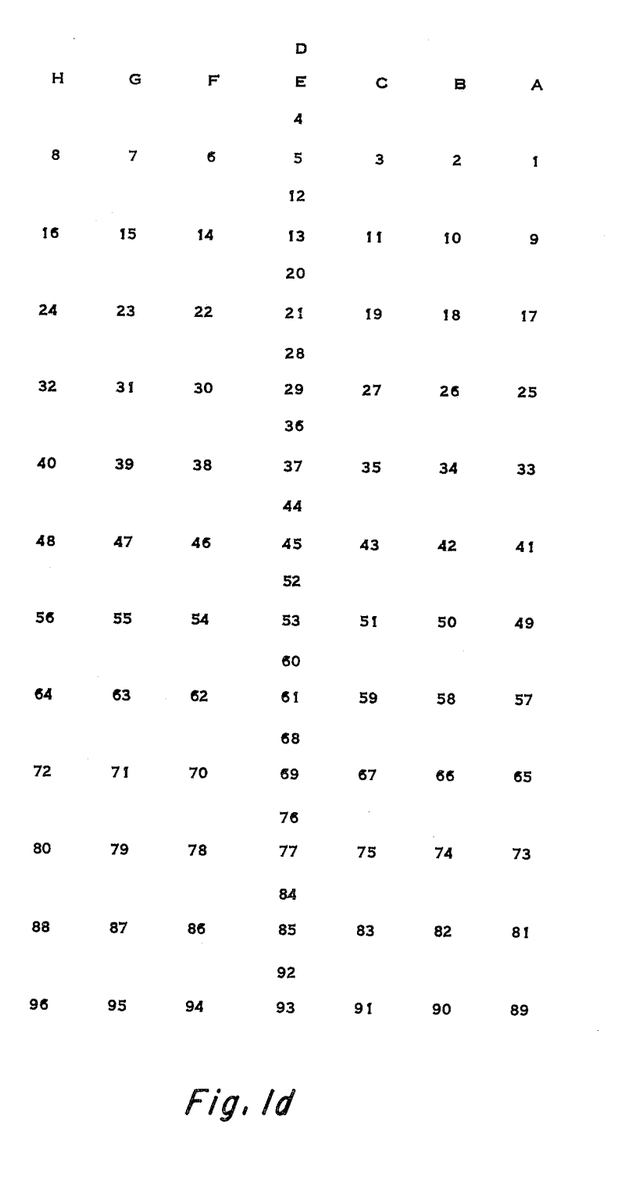
FIG. 1d illustrates the geophone channel numbering for the preferred embodiment of the invention.
Figure 2B:
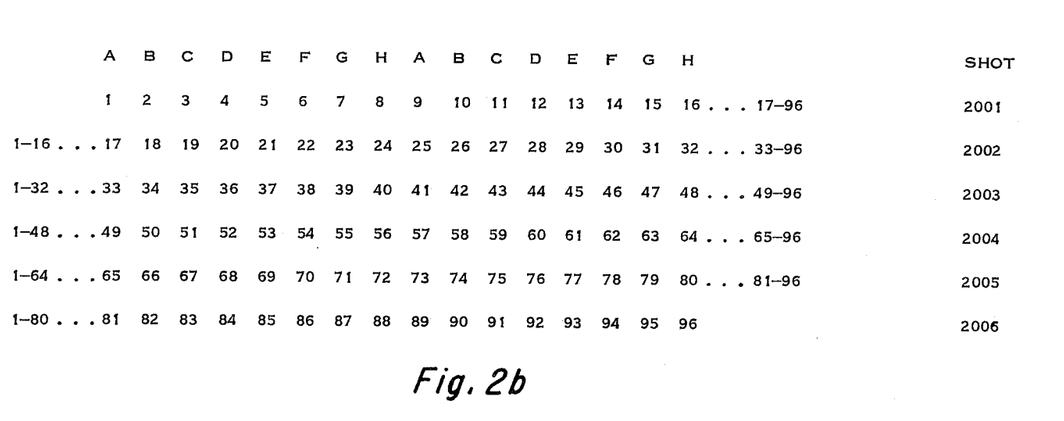
FIG. 2b shows the CDP stacking pattern for the preferred embodiment of the invention.

From FIG. 2b it is seen that the identical trace stacking pattern results for 96 trace, six-fold roll-a-long three-dimensional recording when the channel assignments of FIG. 1d are employed. From a consideration of FIG. 1a, b and d it will be seen that for the six successive shots 2001–2006, the data on channels 1, 17, 33, 49, 65 and 81 will all contain reflections from the same depth point. Accordingly, these six channels are stacked to produce the CDP trace for this depth point. Note that each of these channels represents a geophone located along inline row A of FIG. 1d. Similarly, channels 2, 18, 34, 50, 66 and 82 are summed to produce the stack trace for a depth point for inline row B and channels 3, 19, 35, 51, 67 and 83 are summed to produce the stack for a depth point for row C. Channels 9, 25, 41, 57, 73 and 89, also representing geophones located along inline row A, are summed to produce the stack for another depth point on the subsurface track for inline row A. Similarly, channels 10, 26, 42, 58, 74 and 90 are summed to produce the next depth point on the subsurface track of line B. Thus it will be seen that for this particular configuration, the channels corresponding to geophones located along any given inline row are used to form two sums thereby providing the stacks for two different depth points on each of eight inline lines. Of course, the pattern illustrated in FIG. 2b repeats with each shot to give continuous six-fold three-dimensional coverage along the traverse.

As a result of arranging the roll-a-long three-dimensional spread in this specific configuration, important economic advantages are realized. As is known in the art, existing hardware and software processing equipment has been tailored to be compatible with conventional single line recording arrangements a 96 trace six-fold arrangement for example. The similar stacking pattern for roll-a-long three-dimensional recording when properly arranged, permits direct utilization of the existing processing equipment. The following are further examples of conventional single line arrangements which have direct counterparts in the roll-a-long three-dimensional method. Conventional 48 trace, six-fold single line recording corresponds to a three-dimensional pattern having 12 crossline rows of four geophones each or equivalently four inline rows of 12 geophones each. Conventional 72 trace, 12 fold corresponds to three inline rows of 24 geophones each in three-dimensional. Conventional 72 trace, four-fold corresponds to eight crossline rows of nine geophones each in three-dimensional. By taking advantage of these relationships, three-dimensional data can be processed as if it had been acquired with single line shooting at the particular CDP fold because the standard trace patterns apply both in a surface sense for static evaluation techniques, and in a subsurface sense for stacking.

While the data is in a form suitable for convenient conventional processing techniques, it is simultaneously in a form for advanced three-dimensional schemes.

Another important economic advantage is gained in the field recording of the data. Essentially standard recording equipment is suitable "as is" for the practice of the method, although, certain efficiencies may be realized by some preferred spread wiring schemes. For the practice of the method the instrument engineer can advance through his roll-a-long box as for normal single line shooting. It will be clear that in effect, roll-a-long three-dimensional shooting consists of configuring an areal or three-dimensional recording spread so that operationally in the field and in terms of data processing in the office, it behaves like a standard single line roll-a-long spread.

Another variation on the basic theme may be realized by a procedure that may be termed submultiple moveup of the shot point. In this case, after seismic waves are initiated at shot point 30 the geophone array is permitted to remain in the position indicated in FIG. 1a but the shot point is advanced to location 46. Thus, it will be seen that the advance of a shot point in this case is over a distance which is equal to one-half the spacing between adjacent pairs of geophones along the outrigger lines. Seismic waves initiated at shot point 46 after reflection from subsurface reflecting points along the central control line will again all lie below the points along the central control line of FIG. 1b and give 12-fold coverage. Subsurface reflecting points off of the central control line, however, will all lie below common depth points which are midway between the points appearing along the other lines of FIG. 1b and generate six-fold CDP coverage. Next, the shot point is advanced from location 46 to location 42 of FIG. 1a while the geophone array is advanced by a distance equal to the spacing between adjacent pairs of geophones along the outrigger lines. Seismic waves are again initiated at the shot point location 42. It will be readily appreciated by a consideration of the FIGURES that this procedure of alternately moving just the shot point and then moving the shot point and geophone array will again result in six-fold common depth point coverage, but the density of common depth point coverage along all inline lines other than the central control line will be doubled. In this instance on the central control line the fold of coverage is double while the depth point spacing remains the same. While this procedure has been illustrated with a submultiple moveup of the shot point equal to one-half the spacing between adjacent geophones, other moveup distances may also be used. At each moveup, for example, the shot point can be moved over a distance D where D is a fraction or submultiple of the spacing between any adjacent pair of detectors along one of the parallel lines. Let M be the ratio of the normal spacing between an adjacent pair of inline detectors to the distance D. In accordance with this embodiment the detector array is moved up by a distance M × D but only after each $M^{th}$ moveup of the shot point.

Alternatively, with a given detector arrangement such as that of FIG. 1a, the shot point and detector array may be relocated at each moveup over a distance equal to an integer multiple of the spacing between adjacent pairs of detectors. In such case the fold of the common depth point coverage will be reduced from that achieved when single spacing moveup is utilized.

Submultiple and integer multiple moveups may in some cases be desirably combined.

The invention as described possesses several other advantageous characteristics. The three-dimensional common depth point coverage and high fold of common depth point coverage are a result of the particular receiver array chosen. Multiple excitations at any given shot point or an areal array of shot points is not required to achueve this result. In addition to the economies associated with the small number of shot points the fact that all shot points in the preferred embodiment of the invention lie along a single central control line will in many cases be a significant advantage. In general the degree of access required to locate a source of seismic waves will be greater than that required to locate a geophone or geophone array. In the practice of the present invention the relatively high degree of access required to locate seismic sources need be realized only along the central control line. If need be, the geophones located along the outrigger lines may be placed by crew members operating on foot. Thus, the invention may be practiced when the outrigger lines are located in areas that would be totally inaccessible for the implantation of seismic sources or where such implantation would be unacceptable from an ecological standpoint.

While a desired embodiment of the invention has been disclosed various meodifications will suggest themselves to those skilled in the art. For example, in the desired embodiment two lines of geophones have been arranged to coincide on the central control line. This has the desirable advantage of providing a density of common depth point coverage along the central control line which is twice as great as that achieved off of the central control line. In some cases this advantage may not be required and it may be sufficient to provide a single line of geophones along the central control line. In such case, the spacing between adjacent pairs of geophones will be the same on the central control line as is the case on the outrigger lines, perhaps, only 330 feet or even less. Alternatively, it is not even necessary that the shot point be located along one of the lines of geophones. Further, the various parallel lines along which the geophones are located have been shown to be equispaced. This equispacing of the parallel lines results in the ordered common depth point pattern of FIG. 1b. Equispacing of the parallel lines, however, is not a requisite to the practice of the invention. Rather, any random spacing of the parallel lines may be selected to suit the requirements of the user. The particular spacing chosen will determine the consequent pattern of common depth point coverage. Also, the geophones on the outrigger lines of FIG. 1a are seen to fall along lines which are perpendicular to the direction to the seismic traverse. This feature too is a matter of choice, departures therefrom simply resulting in modification of the pattern of common depth point coverage shown in FIG. 1b.

Figure 3:
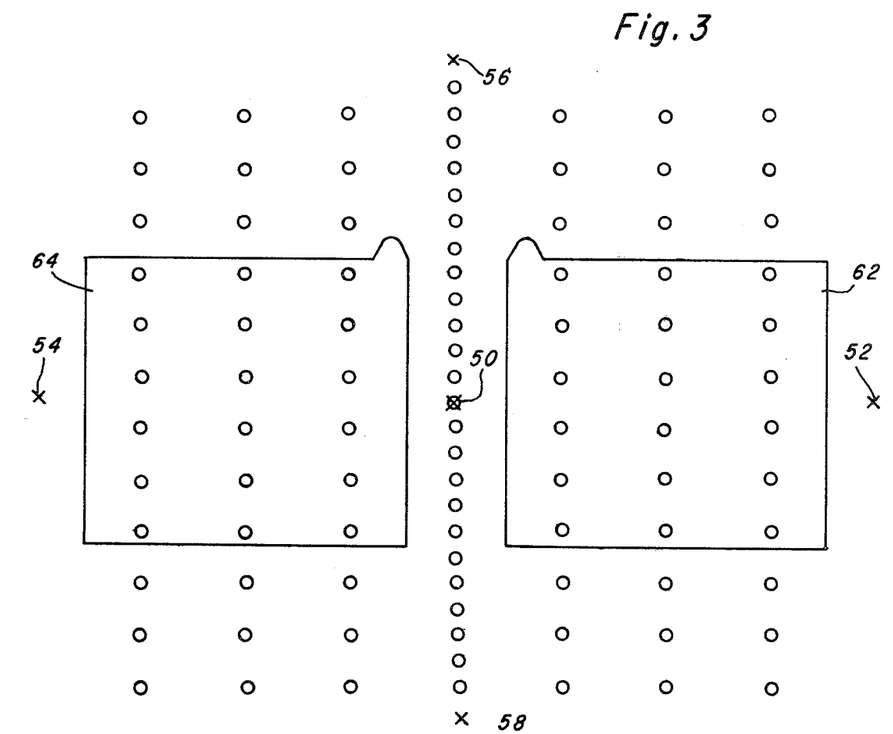
FIG. 3 illustrates the use of multiple shot points.

While the invention has been described as utilizing a single shot point, it may be desirable in certain cases to employ a plurality of shot points. One such procedure is illustrated in FIG. 3 wherein is reproduced the geophone array of FIG. 1a. Here again is shown a centrally located shot point 50 which provided the common depth point coverage illustrated in FIG. 1b. If additional shot points are located at 52 and 54 additional common depth point coverage is realized. Thus, for seismic waves initiated at shot point 52 all subsurface reflecting points will lie below surface points within rectangle 62. Similarly, for seismic waves produced at shot point 54 all subsurface reflecting points will lie below the area enclosed within rectangle 64. It is seen that the use of these additional shot points significantly broadens the common depth point coverage provided by the invention. Shot points 52 and 54 will be advanced with shot point 50 in the geophone array as shooting proceeds along the seismic traverse thus forming three shot lines for this arrangement.

Alternatively, or as a further expansion of the method, additional shot points may be provided "end-on" along the central shot line at points 56 and 58 for example. As will be appreciated by those skilled in the art the use of shot points at these locations in addition to the use of a shot point at location 50 further increases the area of common depth point coverage for one receiver array location and may increase operational efficiency in some circumstances. Shot points 56 and 58 will be advanced with shot point 50 as shooting proceeds. Depending on the exact locations of shotpoints 52, 54, 56 and 58 relative to the receiver array, depth points generated by these shots may fall between or on top of those generated from shot point 50. In the first case a greater density of subsurface points is generated; in the second case a higher fold of coverage is achieved. Those skilled in the art will recognize the utility of greater subsurface density and/or higher folds of coverage for particular seismic prospecting problems. Still other shot point positions than those referred to above may be desirable in some instances.

Figure 4:
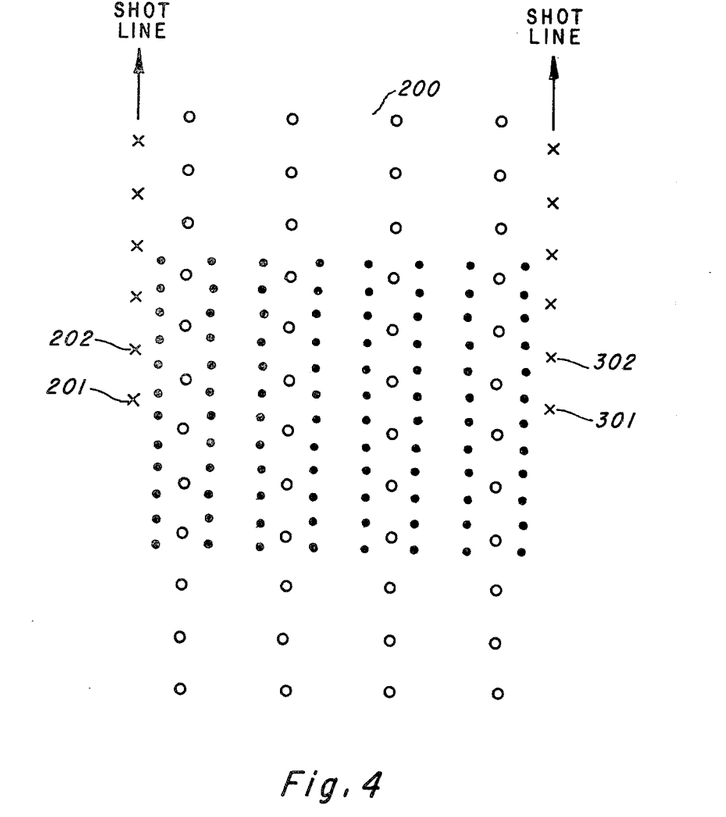
FIG. 4 is an embodiment of the invention having two shot lines.

FIG. 4 illustrates an additional embodiment of the method having particular operational simplicity. The number of receivers on each inline row of receiver array 200 is constant; twelve in the case illustrated. The receiver array is shot from two shot lines. The subsurface pattern generated from shots 201 and 301 is shown by the solid circles of FIG. 4. Subsequently the spread is advanced one crossline and shots taken from position 202 and 302, etc. Six-fold subsurface coverage is developed on eight stack tracks equispaced and parallel between the shot lines.

To those practiced in the art it will be further obvious that additional inline placed rows plaed parallel but outside of the shot lines of FIG. 4 may yield further efficiencies in some circumstances.

Figure 5:
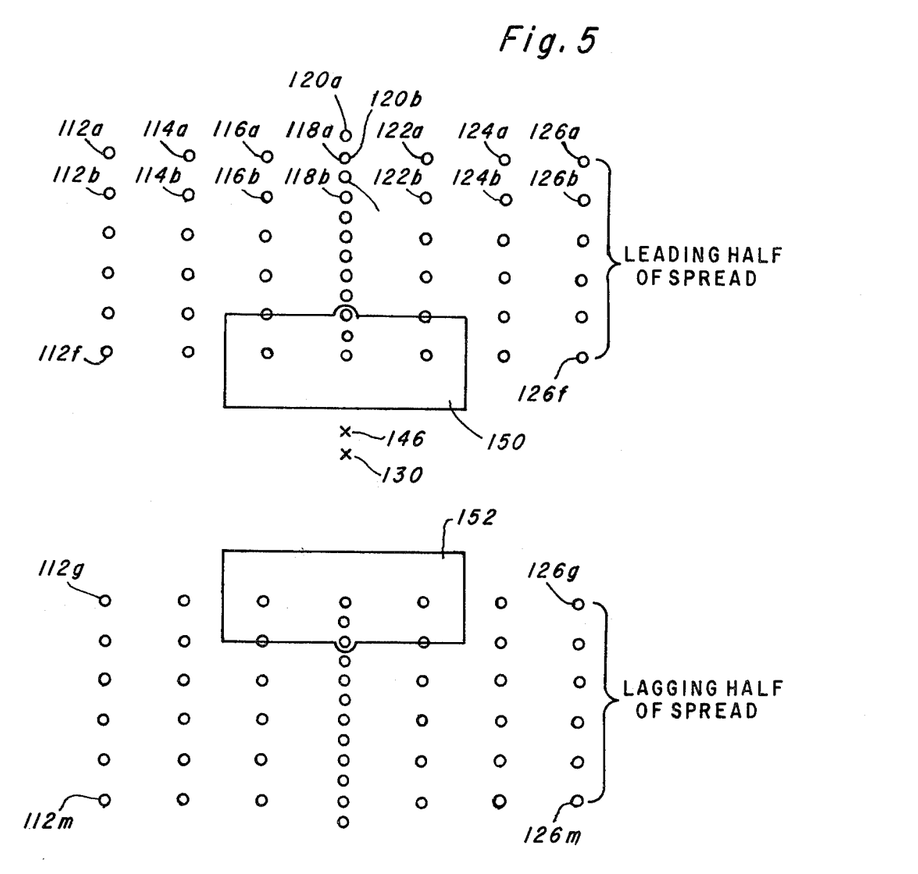
FIG. 5 shows a gapped three-dimensional roll-a-long spread.

In some applications (because of noise conditions at near offsets, the need for greater moveout for improved velocity resolution and/or better multiple attenuation) it may be desirable to have the receiver aray at greater offsets from the shot point(s). A gapped three-dimensional roll-a-long spread can be easily constructed as per FIG. 5. Operational procedure for the leading and lagging halves of the receiver array would be as previously described. After shot 130 is taken, the transmitter advances to 146. Receivers 112f, 114f . . . to 126f, constituting one crossline, are moved up one interval ahead of 112a, 114a . . . to 126a, respectively; similarly 112m, 114, . . . to 126m are effectively moved one interval ahead of 112g, 114g . . . to 126g, respectively. Subsurface coverage per shot 130 for the leading and lagging halves of the receiver spread lies within rectangles 150 and 152 of FIG. 5. In the particular case illustrated, continuous six-fold three-dimensional coverage (with the exception of the taper, of course) is obtained by jointly advancing the transmitter(s) and receiver array as described along the length of the seismic transverse, i.e., the central control line. A slight modification of the configuration of FIG. 5 may also occur to those skilled in the art. The receiver array could be altered so as to assume a general diamond shape. This could be accomplished by drawing the leading and lagging portions of inline rows 112 and 126 together so as to form two continuous inline rows of equispaced receivers. The leading and lagging portions of rows 114 and 124 would be partially drawn together so as to leave a small gap between their leading and lagging portions. Rows 116 and 122 would have a larger gap between their leading and lagging portions while the central control line would remain as shown in FIG. 5. In this way the offsets between the shot point and the innermost receivers would tend to be equalized as would the offsets between the shot point and the outermost receivers.

Still another modification of FIG. 5 consists of drawing the leading and lagging subarrays together until they in fact overlap. This achieves interleaving in the crossline sense. Of course, although it will normally be preferable that the subarrays fall on the same parallel lines, this need not necessarily be the case to the practice of the method.

Whereas the present invention has been described with respect to specific embodiments thereof it would be understood that various changes and modifications will be suggested to one skilled in the art and it is intended to encompass those changes and modifications as fall within the scope of the appended claims.

What is claimed is:

1. The method of seismic exploration comprising:
    a. locating a plurality of seismic detectors along a plurality of parallel lines at least one of said parallel lines being spaced apart from all others of said parallel lines and the spacing between any adjacent pair of detecors along one of said parallel lines being equal to that between any other adjacent pair of detectors along one of said parallel lines, said seismic wave detectors thereby forming a detector array.
    b. locating at least two seismic wave transmitting stations at predetermined locations relative to said plurality of seismic wave detectors,
    c. initiating seismic waves from said at least two seismic wave transmitting stations said seismic waves being received by said detectors,
    d. defining a distance D and a number M where D is a submultiple of the spacing between any adjacent pair of detectors along one of said parallel lines and M is the ratio of said spacing to the distance D,
    e. repeatedly moving said at least two seismic wave transmitting stations a distance D in a direction parallel to any of said plurality of parallel lines and at each $M^{th}$ such move, moving said detector array by a distance equal to the spacing between adjacent pairs of detectors and in a direction parallel to any of said plurality of parallel lines,
    f. after each movement thereof initiating additional seismic waves from said at least two seismic wave transmitting stations, and
    g. repeating steps (e) and (f) until a desired length of seismic traverse has been covered to provide three-dimensional common depth point coverage along said seismic traverse.

2. The method of seismic exploration comprising:
    a. locating a plurality of seismic wave detectors to form two subarrays, each of said subarrays comprising detectors equispaced along a plurality of spaced apart parallel lines and at least one parallel line of one subarray coinciding with a parallel line of the other subarray to form at least one interleaved line,
    b. locating a seismic wave transmitting station at a predetermined point relative to said subarrays,
    c. initiating seismic waves from said seismic wave transmitting station, said seismic waves being received by said detectors,
    d. moving said subarrays and said seismic wave transmitting station a predetermined distance in a direction parallel to any of said spaced apart parallel lines,
    e. initiating additional seismic waves from the newly located seismic wave transmitting station, and
    f. repeating steps (d) and (e) until a desired seismic traverse has been covered to provide three-dimensional common depth point coverage along said traverse.

3. The method of claim 2 wherein each movement of said subarrays and said seismic wave transmitting station covers a distance equal to the spacing between adjacent pairs of said detectors along any of said parallel lines.

4. The method of claim 2 wherein each movement of said subarrays and said seismic wave transmitting station covers a distance equal to an integral multiple of the spacing between adjacent pairs of said detectors along any of said parallel lines.

5. The method of claim 3 wherein prior to each relocation of said subarrays, said seismic wave transmitting station is moved to at least one additional point relative to said subarrays and additional seismic waves are initiated therefrom.

6. The method of claim 3 wherein at least one additional seismic wave transmitting station is located at a predetermined point relative to said subarrays and maintained at said predetermined point relative to said subarrays after each movement thereof.

7. The method of claim 2 wherein at least one additional seismic wave transmitting station is located at a predetermined point relative to said subarrays and after initiating seismic waves from each transmitting stations the subarrays and transmitting stations are moved over a distance equal to an integral multiple of the spacing between adjacent pairs of said detectors along any of said parallel lines.

8. The method of claim 6 wherein prior to each relocation of said subarrays, each seismic wave transmitting station is moved to at least one additional point relative to said subarrays and seismic waves are initiated therefrom.

9. The method of seismic exploration comprising:
    a. locating a plurality of seismic wave detectors along a plurality of parallel lines, the detectors along at least one of said parallel lines being arranged in subsets with the spacing between any adjacent pair of detectors of any subset being equal to a first predetermined distance and the spacing between the first detector of a subset and the last detector of the next subset being a second greater predetermined algebraic distance, said detectors thereby forming a detector array,
    b. locating at least one seismic wave transmitting station at a predetermined location relative to said array,
    c. initiating seismic waves from said at least one seismic wave transmitting station, d. relocating said array and said seismic wave transmitting station a fixed distance along a traverse, e. initiating seismic waves from the newly located at least one seismic wave transmitting station, said seismic waves again being received by said detectors, and f. repeating steps (d) and (e) until a desired distance along said seismic traverse has been covered to provide three-dimensional common depth point coverage along said traverse.

10. The method of claim 9 wherein the detectors along more than one of said parallel lines are arranged in subsets and said second predetermined algebraic distance for at least one of such lines is different than said second predetermined algebraic distance for at least one other of such lines.

11. The method of claim 9 wherein said fixed distance is equal to said first predetermined distance.

12. The method of claim 9 wherein said fixed distance is equal to an integral multiple of said first predetermined distance.

13. The method of claim 10 wherein prior to each movement of said array, said at least one seismic wave transmitting station is moved to at least one additional point relative to said array and new seismic waves are initiated therefrom.

14. A method of seismic exploration comprising:

a. disposing a plurality of seismic wave detectors at regular preselected intervals along each of a plurality of spaced apart lines, each of said lines being parallel to preselected traverse direction, said seismic wave detectors thereby forming a detector array, b. locating at least one seismic wave transmitting station at a predetermined location relative to said plurality of seismic wave detectors, c. initiating seismic waves from said at least one seismic wave transmitting station said seismic waves being received by said detectors, d. relocating said detector array and said at least one seismic wave transmitting station a fixed distance along said traverse direction, said fixed distance being an integral multiple of said regular preselected interval, e. initiating seismic waves from the newly located at least one seismic wave transmitting station, said seismic waves again being received by said detectors, and f. repeating steps (d) and (e) until a desired distance along said traverse has been covered to provide three-dimensional common depth point coverage along said traverse.

15. The method of seismic exploration comprising:

a. locating a plurality of seismic wave detectors on a rectangular grid to form a detector array, said array thereby including a plurality of parallel inline rows of equispaced receivers and plurality of spaced apart crossline rows of receivers, the number of inline rows being equal to the number of detector positions in the normal surface moveup for single line shooting at a particular desired common depth point fold and for a given number of recording channels, and the number of crossline rows being the ratio of the number of recording channels to the number of inline rows, b. locating at least one seismic wave transmitting station at a predetermined location relative to said detector array, c. initiating seismic waves from said at least one seismic wave transmitting station, said seismic waves being received by said detectors, d. relocating said detector array and said at least one seismic wave transmitting station along a direction parallel to said parallel inline rows and over a preselected distance, e. initiating seismic waves from the newly located at least one transmitting station, said seismic waves again being received by said detectors, and f. repeating steps (d) and (e) until a desired distance has been covered to provide three-dimensional common depth point coverage.

16. The method of claim 15 wherein said preselected distance is equal to the spacing between adjacent pairs of detectors along any of said parallel inline rows.

17. The method of claim 15 wherein said preselected distance is an integral multiple of the spacing between adjacent pairs of detectors along any of said parallel inline rows.

18. The method of claim 15 wherein prior to each relocation of said detector array, each seismic wave transmitting station is moved to at least one additional point relative to said detector array and additional seismic waves are initiated therefrom.

19. The method of seismic exploration comprising:

a. locating a plurality of seismic wave detectors in a predetermined pattern to form a two-dimensional array thereof, b. locating at least two seismic wave transmitting stations at predetermined points relative to said array, c. repeatedly relocating said array and said at least two seismic transmitting stations a fixed distance along a preselected direction, d. after each relocation thereof, initiating seismic waves from said at least two seismic wave transmitting stations, said seismic waves being received by said detectors to provide three-dimensional common depth point coverage, and e. prior to each relocation of said array, moving each of said at least two seismic wave transmitting stations to at least one additional point relative to said array and initiating additional seismic waves therefrom.

20. The method of seismic exploration comprising:

a. locating a plurality of seismic wave detectors along a plurality of spaced apart parallel lines, said detectors being equispaced along said parallel lines and said seismic wave detectors thereby forming a detector array, b. locating a plurality of seismic wave transmitting stations at predetermined locations relative to said plurality of seismic wave detectors, c. initiating seismic waves from said plurality of seismic wave transmitting stations, said seismic waves being received by said detectors, d. relocating said detector array and said seismic wave transmitting stations a fixed distance in a direction parallel to said parallel lines, said fixed distance being an integral multiple of the spacing between adjacent pairs of detectors along said parallel lines, e. initiating seismic waves from the newly located transmitting stations, said seismic waves again being received by said detectors, and f. repeating steps (d) and (e) to provide three-dimensional common depth point coverage along a seismic traverse.

* * * * *